(12) United States Patent
Bruce

(10) Patent No.: US 9,017,554 B2
(45) Date of Patent: Apr. 28, 2015

(54) HANDLE FOR UNDERDRAIN

(75) Inventor: Daniel E. Bruce, Murrysville, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 453 days.

(21) Appl. No.: 13/220,088

(22) Filed: Aug. 29, 2011

(65) Prior Publication Data

US 2012/0097594 A1 Apr. 26, 2012

(51) Int. Cl.
   *B01D 24/24* (2006.01)

(52) U.S. Cl.
   CPC ............ *B01D 24/24* (2013.01); *B01D 2201/24* (2013.01)

(58) Field of Classification Search
   CPC ...... B01D 24/24; B01D 2201/24; B25B 9/02; B65G 7/12
   USPC ............. 210/237, 238, 293, 470; 294/33, 170
   See application file for complete search history.

(56) References Cited

U.S. PATENT DOCUMENTS

| | | | |
|---|---|---|---|
| 1,578,105 A * | 3/1926 | Taylor | 294/169 |
| 1,811,730 A | 6/1931 | Newton | |
| 2,169,119 A | 8/1939 | Blum | |
| 2,813,631 A | 11/1957 | Odman | |
| 2,929,505 A | 3/1960 | Wanner | |
| 3,701,558 A * | 10/1972 | Baker | 294/33 |
| 4,237,011 A * | 12/1980 | Acosta | 210/237 |
| 4,632,442 A * | 12/1986 | Gerding | 294/16 |
| 4,717,475 A | 1/1988 | Brandt et al. | |
| 4,767,531 A | 8/1988 | Holzer | |
| 4,913,813 A * | 4/1990 | Covarrubias et al. | 210/232 |
| 5,028,333 A | 7/1991 | Wright et al. | |
| 5,037,541 A | 8/1991 | Ruey-Jang et al. | |
| 5,108,627 A | 4/1992 | Berkebile et al. | |
| 5,173,195 A | 12/1992 | Wright et al. | |
| 5,427,679 A | 6/1995 | Daniels | |
| 5,486,287 A | 1/1996 | Murphy et al. | |
| 5,607,584 A | 3/1997 | Swiatek et al. | |
| 5,611,922 A | 3/1997 | Stene | |

(Continued)

FOREIGN PATENT DOCUMENTS

| | | |
|---|---|---|
| JP | 10-183733 A | 7/1998 |
| JP | 11-222400 A | 8/1999 |

(Continued)

OTHER PUBLICATIONS

Universal Underdrain; Bulletin No. ASU-100; The F. B. Leopold Co.; 1987; Zelienople, PA, USA; 4 pages.

*Primary Examiner* — Matthew O Savage
(74) *Attorney, Agent, or Firm* — The Webb Law Firm

(57) ABSTRACT

An underdrain block including a top wall, a bottom wall, and a pair of sidewalls defining a hollow interior and having a longitudinal axis, wherein the sidewalls, top wall, or both comprise at least one external detail. A handle is detachably connected to the external detail for transportation and positioning of said underdrain block. The external detail may comprise one of a protrusion or a receptacle for receiving a protrusion and the handle may include the other of a protrusion or a receptacle for receiving a protrusion. Also, a method of installing an underdrain block lateral comprising at least one underdrain block including the steps of attaching a handle to external details on the underdrain block, lifting the underdrain block lateral by the handle, positioning the underdrain block lateral into the underdrain system, and detaching the handle from the external details of the underdrain block.

8 Claims, 8 Drawing Sheets

(56) References Cited

U.S. PATENT DOCUMENTS

| | | |
|---|---|---|
| 5,618,419 A | 4/1997 | Fuerst |
| 5,733,445 A | 3/1998 | Fanelli |
| 5,855,744 A | 1/1999 | Halsey et al. |
| 6,110,366 A | 8/2000 | Hunkele et al. |
| 6,113,780 A | 9/2000 | Buzanoski |
| 6,235,195 B1 | 5/2001 | Tokar |
| 6,254,770 B1 | 7/2001 | Remon |
| 6,257,043 B1 | 7/2001 | Wiens |
| 6,537,447 B2 | 3/2003 | Remon |
| 6,592,756 B1 | 7/2003 | Felix, Jr. et al. |
| 6,740,237 B1 | 5/2004 | Roberts et al. |
| 6,991,726 B2 | 1/2006 | St. Germain |
| 7,063,787 B2 | 6/2006 | Jackson et al. |
| 7,192,521 B2 | 3/2007 | St. Germain |
| 7,438,803 B1 | 10/2008 | Allen |
| 2002/0153298 A1 | 10/2002 | Blaze |
| 2008/0277324 A1 | 11/2008 | Meyers |

FOREIGN PATENT DOCUMENTS

| | | |
|---|---|---|
| JP | 2000-034768 A | 2/2000 |
| JP | 2002-274793 A | 9/2002 |
| JP | 2003-239366 A | 8/2003 |
| WO | 00/37158 A1 | 6/2000 |

\* cited by examiner

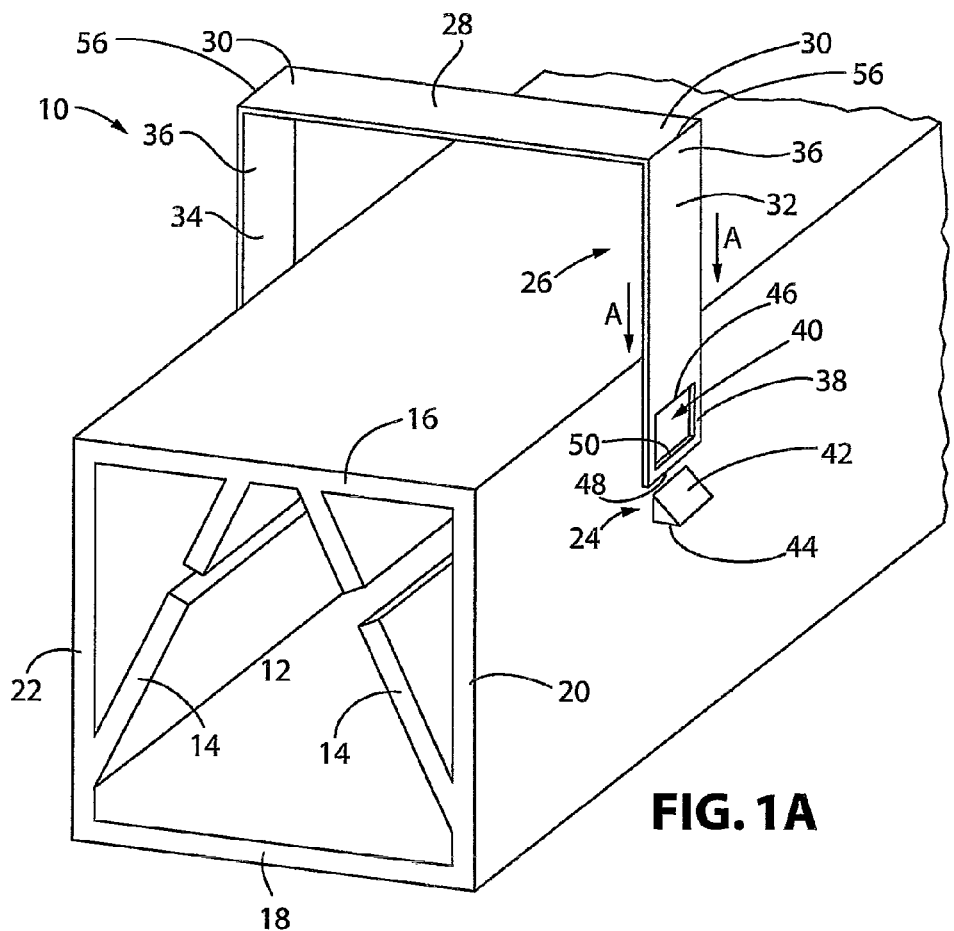
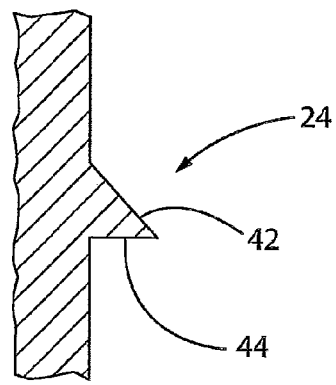
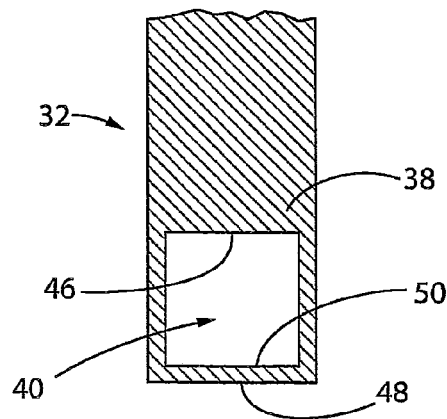
FIG. 1A
FIG. 1B
FIG. 1C

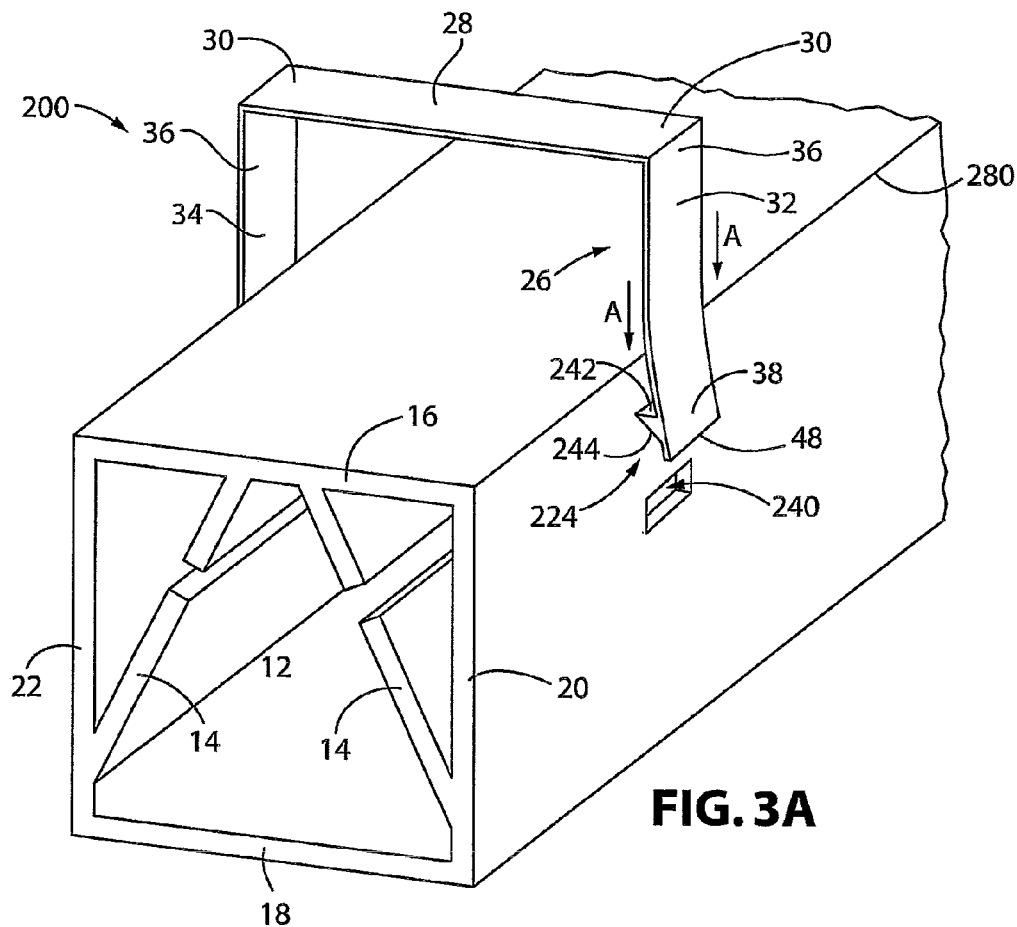
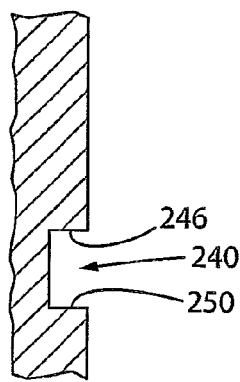
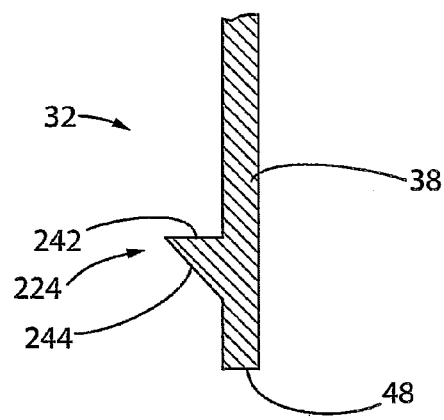
FIG. 3A
FIG. 3B
FIG. 3C

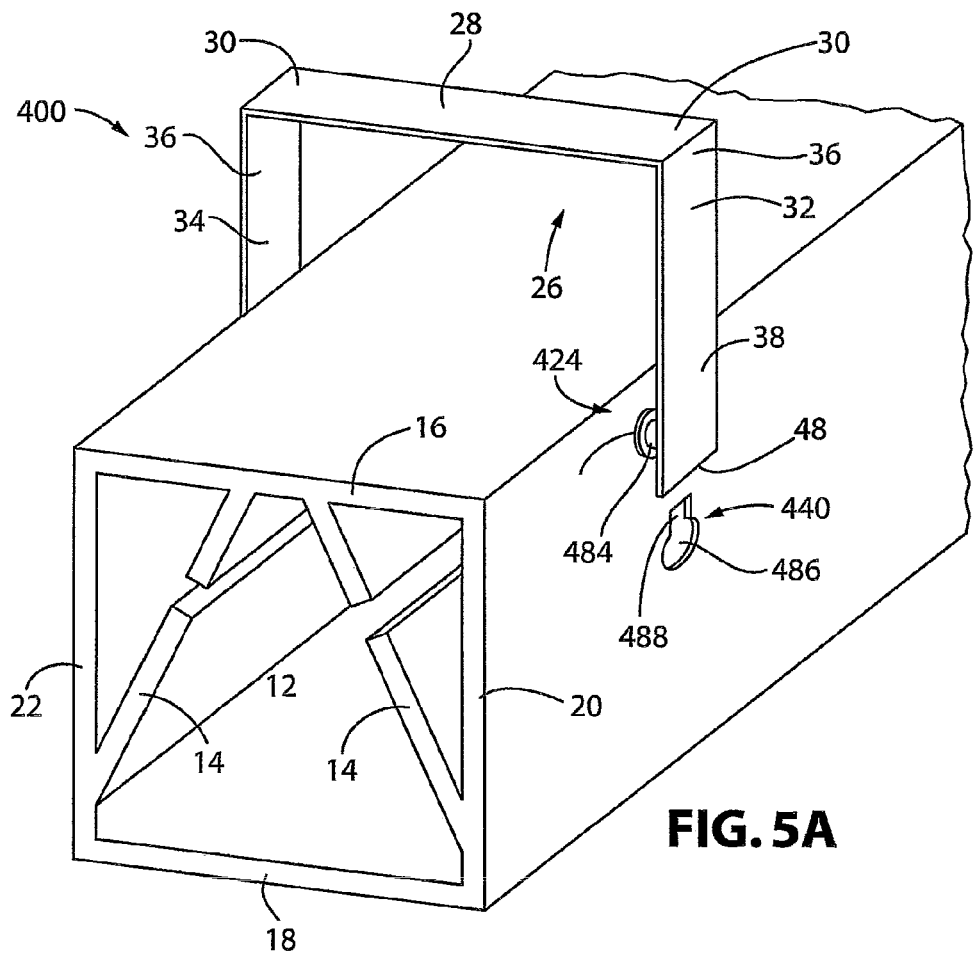
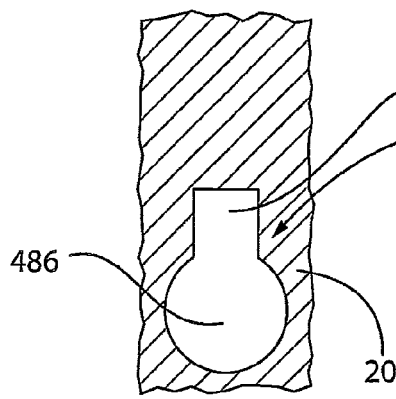
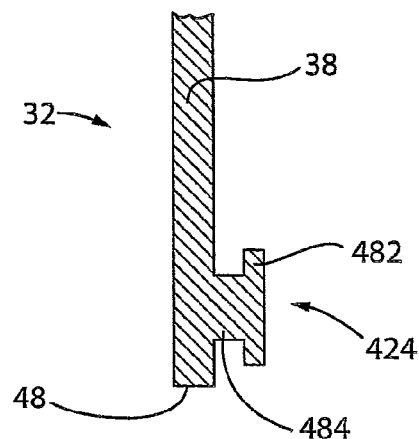
FIG. 5A
FIG. 5B
FIG. 5C

HANDLE FOR UNDERDRAIN

CROSS REFERENCE TO RELATED APPLICATIONS

The present application claims priority to U.S. Provisional Patent Application No. 61/377,610, filed Aug. 27, 2010, entitled "Handle for Underdrain", which is hereby incorporated by reference in its entirety.

BACKGROUND OF THE INVENTION

1. Field of the Invention

This invention relates to underdrain blocks used in draining and backwashing filtering media in a filter bed, generally referred to as a gravity filter, where liquid is supplied to the filtering media from a position vertically above the media and passes down through the media to an underdrain system comprising a plurality of said underdrain blocks and a method of installing an underdrain block lateral comprising at least one underdrain block.

2. Description of Related Art

Filter beds where liquid is supplied to the filtering media from a position vertically above the media and passes down through the media, commonly referred to as gravity filters, often use underdrain blocks to form the drainage and backwash system in the bottom of the filter. The filtering media sits atop these underdrain blocks. The solution to be filtered is introduced into the top of the filter and gravity causes it to pass vertically downward through the filtering media and into the underdrain blocks. The underdrain blocks channel the filtered fluid which has passed through the filter media away from the filter.

In addition, it is occasionally necessary to clean the filter media. This is accomplished through a backwash procedure in which water and/or air is forced through the underdrain blocks and upward through the filter media against the force of gravity.

There are a variety of underdrain blocks known in the art, for example, U.S. Pat. No. 2,929,505 to Wanner, U.S. Pat. No. 5,108,627 to Berkebile et al., U.S. Pat. Nos. 6,991,726 and 7,192,521 to St. Germain. U.S. Pat. No. 5,108,627 describes a common underdrain block and is incorporated herein by reference.

Underdrain blocks are generally square or rectangular in cross section and have a long longitudinal axis as compared to their cross section. The underdrain blocks are approximately 4 feet in length. They are attached end-to-end using a snap-fit bell and spigot arrangement to form long sections of up to 96 feet called laterals. The laterals are installed side-by-side in the bottom of the filter to form the underdrain system. Each lateral is placed between a set of anchor rods and is in close proximity to one another. Often, the laterals will be placed in a layer of concrete to secure them in position and level the assembly.

The laterals are heavy and can be awkward to handle due to their length. In addition, they must be carefully placed between the anchor rods with as little as 1.5 inches between the sidewalls of adjacent laterals. The laterals can weigh hundreds of pounds, depending on length and whether media retainer is installed. Therefore, it takes several workers to position and install an underdrain block in the bottom of a filter and, often, due to the awkward way in which the laterals must be handled, the installation workers receive bruises and scrapes during the installation.

While underdrain blocks, such as the one described in U.S. Pat. No. 5,108,627, may include flange members on the sides to assist in handling and placement of the underdrain blocks, due to the close proximity in which the underdrain blocks must be placed, the flanges cannot extend very far from the side of the underdrain block and are not very useful when trying to position one lateral in close proximity with another. Alternatively, ropes have been used to lower the laterals into position, but this becomes very messy when the underdrain blocks are being set in wet concrete.

Thus, current underdrain blocks tend to be unwieldy to handle and difficult to position when they have been formed into laterals for potentially resulting in injury to the workers installing the laterals, and loss of productivity.

SUMMARY OF THE INVENTION

The present invention is directed to an underdrain block for use in draining and backwashing filtering media in a filter bed, commonly referred to as a gravity filter, where liquid is supplied to the filtering media from a position vertically above the media and passed down through the media to a drainage system made up of such underdrain blocks, and a handle for an underdrain block having at least one attachment feature adapted to engage a corresponding external feature of the underdrain block to detachably attach the handle to the underdrain block.

The underdrain blocks include a plurality of exterior walls defining a hollow interior and having a longitudinal axis. The exterior walls include a top wall, a bottom wall, and a pair of sidewalls extending between said top wall and said bottom wall. The sidewalls each comprise at least one external detail. A handle is detachably connected to the external details on the sidewalls for transportation and positioning of said underdrain block.

The at least one external detail of each sidewall may comprise one of a protrusion or a receptacle for receiving a protrusion and the handle may include the other of a protrusion or a receptacle for receiving a protrusion. When a corresponding protrusion is received in a corresponding receptacle, the handle is detachably attached to the underdrain block. When the at least one external detail is a protrusion, the handle may include at least one hole. The protrusion may have a top portion and a bottom portion shaped such that it has a slope to assist in attaching and detaching the handle from the underdrain block, such that it creates a snap fit with the receptacle, or may be configured to create a slotted fit with the receptacle. Alternatively, the at least one external detail could be placed on the top wall of the underdrain block.

One embodiment of the present invention is directed to an underdrain block for use in draining and backwashing filtering media in a filter bed of the type where liquid may be supplied to the filtering media from a position vertically above the media and passed down through the media to an underdrain system including a plurality of said underdrain blocks. The underdrain block may include a plurality of exterior walls defining a hollow interior and having a longitudinal axis, said exterior walls including a top wall, a bottom wall, and a pair of sidewalls extending between said top wall and said bottom wall, said sidewalls, top wall, or both having at least one external detail and a handle detachably connected to the at least one external detail for transportation and positioning of the underdrain block. The at least one external detail may include one of a protrusion or a receptacle for receiving a protrusion, and the handle may include the other of a protrusion or a receptacle for receiving a protrusion. The at least one protrusion or receptacle for receiving a protrusion may correspond with the other of a protrusion or a receptacle for receiving a protrusion on the handle such that, when a corresponding protrusion is received in a corresponding receptacle, the handle is detachably attached to the underdrain block. The at least one external detail could be a protrusion and the handle has at least one hole. When the at least one external detail is a protrusion, the protrusion could have a top portion and a bottom portion, wherein an upper surface of the top is sloped and the bottom portion is sized and shaped to correspond with a correspondingly sized and shaped hole in the handle. The handle could include a horizontal portion and two vertical portions attached to each end of the horizontal portion. At the bottom end of each of the vertical portions, the handle could further include a protrusion or a receptacle for receiving a protrusion. The handle receptacle for receiving a protrusion could be a hole. Middle portions of the horizontal and vertical portions of the handle could be reinforced leaving portions of each end unreinforced. The vertical portions of the handle could be flexible enough to allow the vertical portions to be deflected in an outward direction and return to their original positions when a deflecting force is removed. The underdrain block would further include more than one external feature on each sidewall and at least one handle. The handle could be a flexible strap.

Another embodiment of the present invention is directed to a method of installing an underdrain block lateral for use in draining and backwashing filtering media in a filter bed of the type where liquid may be supplied to the filtering media from a position vertically above the media and passed down through the media to an underdrain system, wherein the underdrain block lateral includes at least one underdrain block comprising a plurality of exterior walls defining a hollow interior and having a longitudinal axis, said exterior walls including a top wall, a bottom wall, and a pair of sidewalls extending between said top wall and said bottom wall. The method includes the step of attaching a handle to at least one external detail on the at least one underdrain block, lifting the underdrain block lateral by the handle, positioning the underdrain block lateral into the underdrain system, and detaching the handle from the at least one external detail on the at least one underdrain block sidewalls. The at least one external detail could include a protrusion on the at least one underdrain block, and the step of attaching the handle to the underdrain block lateral could be achieved by engaging at least one hole on the handle with the protrusion. The step of detaching the handle from the at least one external detail on the at least one underdrain block could include applying force to the handle against a slope on the protrusion to disengage the protrusion from the hole. The step of attaching the handle could utilize a snap fit with the external details. The method could include a lateral that includes a plurality of underdrain blocks and a plurality of handles.

Yet another embodiment of the claimed invention is directed to a handle for an underdrain block for use in draining and backwashing filtering media in a filter bed including at least one attachment feature adapted to engage a corresponding external detail of the underdrain block to detachably attach the handle to the underdrain block. The at least one attachment feature of the handle could include a protrusion or a receptacle for receiving a protrusion adapted to engage an external detail on the underdrain block including the other of a protrusion or a receptacle for receiving a protrusion. When the attachment feature is a receptacle for receiving a protrusion, the receptacle could be a hole. The handle could include a horizontal portion and two vertical portions attached to each end of the horizontal portion, and the attachment feature could be located at the bottom end of each of the vertical portions. A middle portion of the horizontal portion and vertical portions of the handle could be reinforced, leaving a portion at each end unreinforced. An attachment point between the horizontal portion and the vertical portions could be flexible enough to allow the vertical portions to be deflected in an outward direction and return to their original positions when a deflecting force is removed. Lastly, the handle could be a flexible strap.

BRIEF DESCRIPTION OF THE DRAWINGS

A more complete understanding of the present invention can be obtained by considering the following description in conjunction with the accompanying drawing figures in which:

FIG. 1A is a perspective view of one embodiment of an underdrain block according to the invention;

FIG. 1B is an expanded cross-sectional view of the protrusion on the sidewall of the underdrain block shown in FIG. 1A;

FIG. 1C is an expanded planar view of the bottom of one of the vertical portions of the handle shown in FIG. 1A;

FIG. 3A is a perspective view of one embodiment of an underdrain block according to the invention;

FIG. 3B is an expanded cross-sectional view of the receptacle on the sidewall of the underdrain block shown in FIG. 3A;

FIG. 3C is an expanded cross-sectional view of the bottom of one of the vertical portions of the handle shown in FIG. 3A;

FIG. 5A is a perspective view of a fifth embodiment of an underdrain block according to the invention;

FIG. 5B is an expanded planar view of the receptacle on the sidewall of the underdrain block shown in FIG. 5A;

FIG. 5C is an expanded cross-sectional view of the bottom of one of the vertical portions of the handle shown in FIG. 5A;

DETAILED DESCRIPTION OF THE INVENTION

Figure 2A:
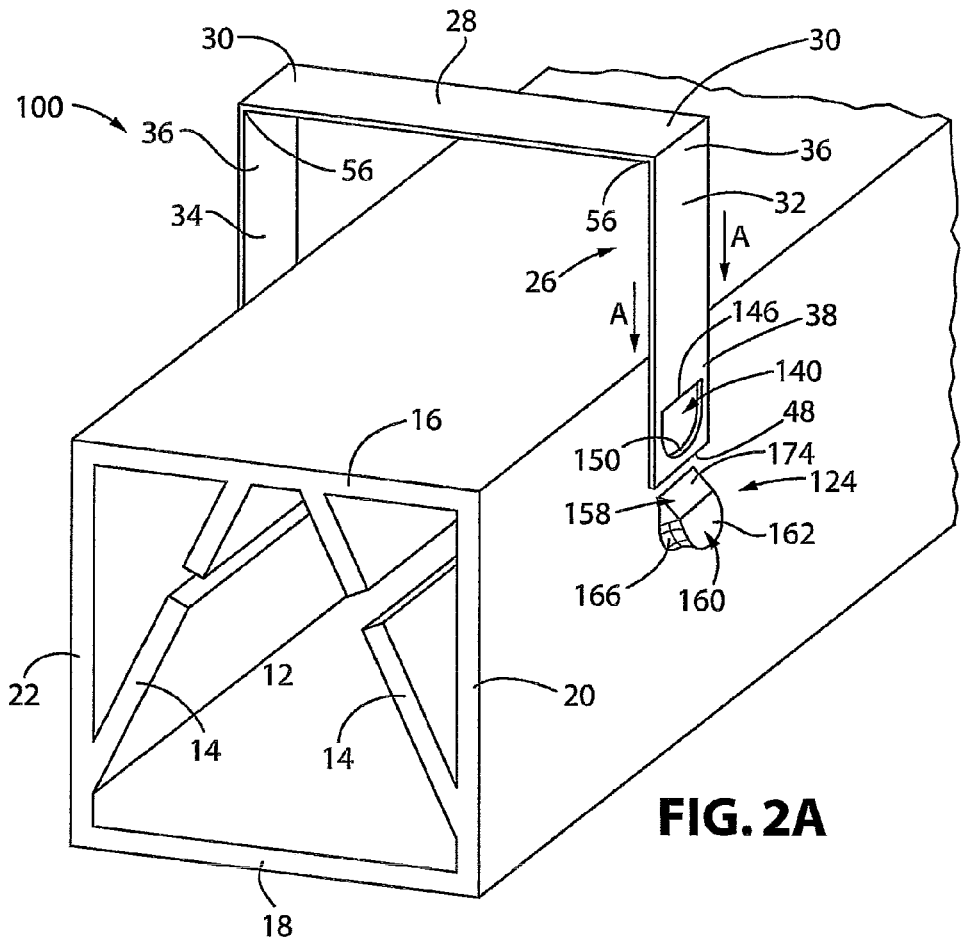
FIG. 2A is a perspective view of a second embodiment of an underdrain block according to the invention.

For purposes of the description hereinafter, the words "upper", "lower", "right", "left", "top", "bottom", "vertical", "horizontal", "inward", "outward", "lateral", "longitudinal" and like spatial terms, if used, shall related to the described embodiments as oriented in the drawings figures. However, it is to be understood that many alternative variations and embodiments may be assumed excepted where expressly specified to the contrary. It is also to be understood that the specific devices and embodiments illustrated in the accompanying drawings and described herein are simply exemplary embodiments of the invention.

The weight and size laterals formed from currently available underdrain blocks make them difficult to install, as described above, which can result in worker injuries, inaccurate placement, and loss of efficiency. The underdrain block of the present invention, while incorporating all of the features of known underdrain blocks, includes a detachable handle to assist in movement and placement of the laterals, and reduces the potential for injuries and inaccurate placement while increasing efficiency.

In one embodiment shown in FIGS. 1A-1C, the block 10 has a plurality of exterior walls that define a longitudinal hollow interior 12 where the solution being filtered passes and where water and/or air may pass during the backwash cycle. The hollow interior 12 may include a plurality of partitions 14 that divide the interior 12 into a plurality of chambers. The exterior walls include a top wall 16, a bottom wall 18, and a pair of sidewalls 20, 22 that extend between the top wall 16 and the bottom wall 18. These features are common to all of the embodiments of the present invention. In this embodiment, each sidewall 20, 22 has at least one protrusion 24 extending from its outer surface. The protrusions 24 are placed at the same height along the sidewalls 20, 22 and substantially opposite from one another.

A detachable handle 26 having a horizontal portion 28 having two ends 30 and two vertical portions 32, 34 having a top end 36 and a bottom end 38 is provided. A top end 36 of one vertical portion 32 is attached to one end 30 of the horizontal portion 28, and the top end 36 of the other vertical portion 34 is attached to the other end 30 of the horizontal portion 28 to form a U-shape. The handle 26 has a receptacle 40 for receiving the protrusion 24 on the underdrain block sidewalls 20, 22 at the bottom end 38 of each of the two vertical portions 32, 34.

The protrusions 24 and the receptacles 40 are sized and shaped to correspond to one another such that the protrusions 24 are received in the receptacles 40; however, the size and shape may vary as long as a connection is formed between the handle 26 and the underdrain block 10 that is sufficient to allow the underdrain block 10 to be lifted and positioned using the handle 26.

In this embodiment, the protrusion 24 has a triangular cross-section such that a top 42 of the protrusion 24 slopes down and away from the sidewalls 20, 22 of the underdrain block 10. A bottom 44 of the protrusion 24 is a flat plane perpendicular to the sidewalls 20, 22.

The receptacles 40 in the handle 26 are holes extending through the full thickness of the handle 26 that are sized and shaped to correspond with the size and shape of the protrusions 24 on the underdrain block 10. The receptacle 40 has a top edge 46 that is generally flat. The vertical portions 32, 34 of the handle 26 have bottom edges 48 that are flat. The horizontal portion 28 of the handle 26 is sized to be slightly larger than the width of the underdrain block 10. The vertical portions 32, 34 or the connection or attachment point between the horizontal portion 28 of the handle 26 and the vertical portions 32, 34 of the handle 26 has some flexibility to allow the vertical portions 32, 34 of the handle 26 to flex in an outward direction when an outward force is placed on them and return to their original positions when the force is removed.

The handle 26 is placed over the top wall 16 of the underdrain block 10 such that the horizontal portion 28 of the handle 26 is parallel with the top wall 16 of the underdrain block 10 and the vertical portions 32, 34 of the handle 26 are parallel with the sidewalls 20, 22 of the underdrain block 10 with their bottom edges 48 located directly above the protrusions 24. The handle 26 is then forced downward indicated by arrow A so that the flat bottom edge 48 of the vertical portions 32, 34 contacts the sloped top 42 of the protrusion 24. As the handle 26 continues to be forced in a downward direction, the flat bottom edge 48 of the vertical portions 32, 34 follows the sloped top 42 of the protrusion 24 and the vertical portions 32, 34 are forced in an outward direction away from the sidewalls 20, 22 until a bottom edge 50 of the receptacle 40 is in a position corresponding with the bottom edge 44 of the protrusion 24. At this point, the outward force from the protrusion 24 on the vertical portions 32, 34 of the handle 26 is released. The vertical portions 32, 34 of the handle 26 return to their original position and snap back towards the sidewalls 20, 22. The protrusion 24 then extends into the receptacle 40. When an upward force is applied to the horizontal portion 28 of the handle 26 in order to lift and move the underdrain block 10, the protrusion 24 on the sidewalls 20, 22 extending into the receptacle 40 on the handle 26 acts to lock the handle 26 to the underdrain block 10. In this way, the underdrain block 10 or a lateral composed of several underdrain blocks 10 can be carried using the handle 26 in a manner similar to the way in which one would carry a bucket.

A plurality of handles 26 may be attached to a plurality of protrusions 24 spaced longitudinally along the underdrain block 10 to allow for multiple attachment positions for the handles 26 to the underdrain block 10.

After the underdrain block 10 or a lateral made of several underdrain blocks 10 has been installed, the handle 26 may be detached in a manner similar to the way in which it was attached. The handle 26 is then forced downward indicated by arrow A until the flat top edge 46 of the receptacle 40 contacts the sloped top surface 42 of the protrusion 24. As the application of force to the handle 26 continues to be forced downward indicated by arrow A, the flat top edge 46 of the receptacle 40 follows the sloped top surface 42 of the protrusion 24 and the vertical portions 32, 34 of the handle 26 are forced in an outward direction away from the sidewalls 20, 22 until the top edge 46 of the receptacle 40 has completely passed the bottom surface 44 of the protrusion 24, completely freeing the receptacle 40 from the protrusion 24. By moving the handle 26 in a direction parallel to the longitudinal axis of the block, the handle 26 can be detached from the underdrain block 10.

The length of the vertical portions 32, 34 of the handle 26 and the placement of the protrusions 24 on the sidewalls 20, 22 of the underdrain block 10 must be sufficient to allow room between the top wall 16 of the underdrain block 10 and the horizontal portion 28 of the handle 26 for the handle 26 to be gripped to move and position the underdrain block 10 and to allow for the downward motion necessary to detach the handle 26 from the underdrain block 10 without the horizontal portion 28 of the handle 26 or the hand of the person applying the downward force on the handle 26 to contact the top wall 16 of the underdrain block 10.

While in this case the protrusion 24 has a triangular cross-section and the receptacle 40 is a square hole, it is contemplated that any size and shape combination of protrusion 24 and receptacle 40 that provides for sufficient attachment of the handle 26 to the underdrain block 10 could be used. In addition, the receptacle 40 need not be a hole but could be a depression sized and shaped to correspond to the protrusion 24 on the sidewalls 20, 22 or could be a simple loop or eyelet. Depending on the size and shape configuration, the protrusion 24 and/or receptacle 40 may not automatically provide the outward force on the vertical portions 32, 34 of the handle 26 needed to attach and detach the handle 26 as described for this embodiment. In this case, it would be necessary for the user of the handle 26 to manually apply the outward force as necessary to attach and detach the handle 26. An example of such an embodiment would be a protrusion 24 that is a downward-facing hook on the underdrain block 10 and a receptacle 40 that is a loop or an eyelet on the vertical portions 32, 34 of the handle 26.

The protrusion 24 may be a separate piece attached to the underdrain block 10 via a screw, adhesive, or any other suitable attachment means or it may be integrally molded with the underdrain block 10. It may be made of the same material as the underdrain block 10 or from any material suitable for use in the filter bed environment, including, but not limited to, corrosion-resistant metal, plastic, or resin.

The handle 26 may be made of any material having suitable strength for lifting the underdrain block 10 or a plurality of underdrain blocks 10 connected into a lateral, including but not limited to sheet metal and plastic, and may be manufactured using any suitable operation, including, but not limited to, stamping, bending, molding, or a combination thereof. The horizontal 28 and vertical portions 32, 34 of the handle 26 may be reinforced as long as an attachment point, such as a corner area 56, where the horizontal portion 28 connects to the vertical portions 32, 34 still has sufficient flexibility to allow the vertical portions 32, 34 to flex during attachment and detachment from the underdrain block 10. For example, this may be accomplished in a metal handle 26 by providing hem flanges in the middle portion of the horizontal 28 and vertical portions 32, 34 to stiffen the handle 26, or in a plastic handle 26 by increasing the thickness of the plastic in these areas. While represented in this embodiment as generally U-shaped with a straight horizontal portion 28, the handle 26 may take any shape suitable for lifting the underdrain block 10 or a lateral composed of several underdrain blocks 10. For example, the straight horizontal portion 28 could be replaced with a curved, substantially horizontal portion or the horizontal portion could contain indentations for the placement of the workers hands or a piece of lifting equipment.

Figure 2B:
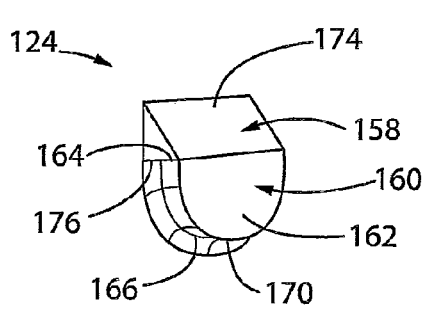
FIG. 2B is an expanded perspective view of the protrusion on the sidewall of the underdrain block shown in FIG. 2A.
Figure 2C:
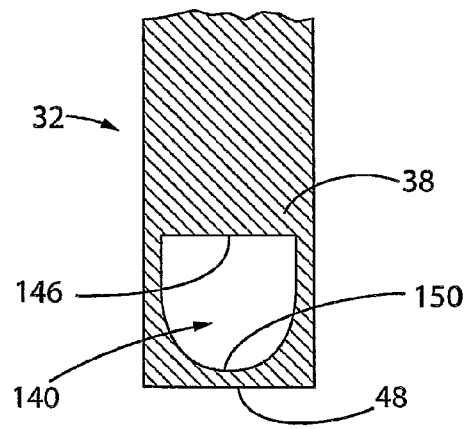
FIG. 2C is an expanded planar view of the bottom of one of the vertical portions of the handle shown in FIG. 2A.
Figure 4A:
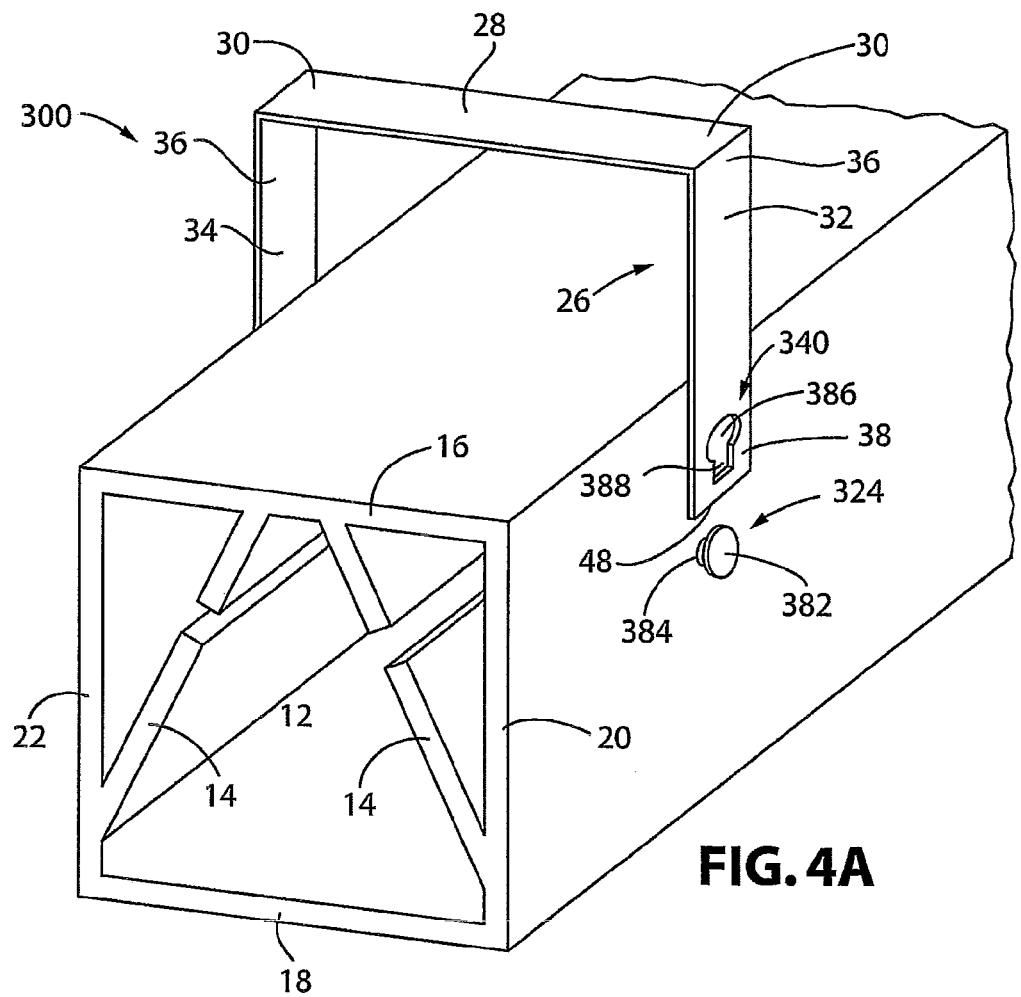
FIG. 4A is a perspective view of a third embodiment of an underdrain block according to the invention.
Figure 4B:
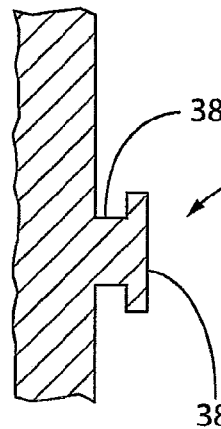
FIG. 4B is an expanded cross-sectional view of the protrusion on the sidewall of the underdrain block shown in FIG. 4A.
Figure 4C:
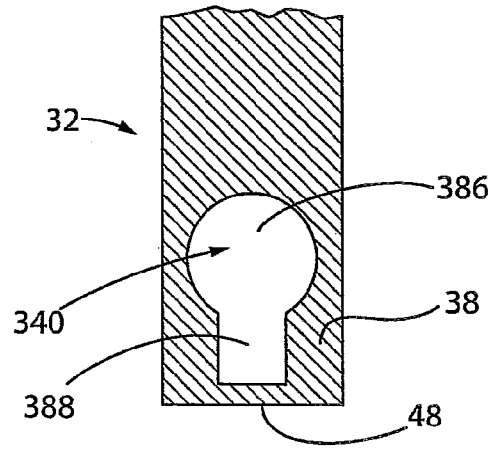
FIG. 4C is an expanded planar view of the bottom of one of the vertical portions of the handle shown in FIG. 4A.

In another embodiment, shown in FIGS. 2A-2C, a protrusion 124 and a receptacle 140 are further modified to further secure the handle 26 to an underdrain block 100. The protrusion 124 has a first portion 158 generally triangular in shape as in the previous embodiment; however, below this first portion 158 is a second portion 160 having a substantially U-shape with a front 162, a top 164, and sidewalls 166. The top 164 has the identical size and shape as a bottom surface 168 of the first portion 158 of the protrusion 124. The front 162 is generally U-shaped with a curved bottom edge 170. The sidewall 166 of the second portion 160 of the protrusion 124 extends from the front 162 of the second portion 160 of protrusion 124 to the sidewalls 20, 22 of the underdrain block 100 and is curved, following the curved edge 170 of the U-shaped front 162. The surface of sidewall 166 is concave.

The receptacle 140 is a hole having a curved bottom edge 150 and a flat top edge 146, and is substantially U-shaped. As the handle 26 is forced downward indicated by arrow A over the protrusion 124, the vertical portions 32, 34 of the handle 26 are forced outward by a sloped top surface 174 of the first portion 158 of the protrusion 124 as previously described; however, after the bottom edge 150 of the receptacle 140 reaches a bottom edge 176 of the first portion 158 of the protrusion 124, the vertical portions 32, 34 of the handle 26 then slide down the front 162 of the second portion 160 of the protrusion 124 until the bottom edge 150 of the receptacle 140 passes the bottom edge 170 of the second portion 160 of the protrusion 124. The outward force on the vertical portions 32, 34 of the handle 26 is released and the vertical portions 32, 34 return to their original position and snap back towards the sidewalls 20, 22. The protrusion 124 now extends into the receptacle 140. When an upward force is applied to the horizontal portion 28 of the handle 26 in order to lift and move the underdrain block 100, the bottom edge 150 of receptacle 140 rests in the concave surface of sidewall 166 of the second portion 160 of the protrusion 124, and the protrusion 124 on the sidewalls 20, 22 extends into the receptacle 140 on the handle 26 to lock the handle 26 to the underdrain block 100.

The corresponding size and shape of the bottom edge 170 of the front portion 162 and sidewall 166 of the second portion 160 of the protrusion 124 and the bottom edge 150 of the receptacle 140 result in an attachment that prevents side-to-side motion and helps the handle 26 to stay in place over the protrusion 124 when the handle 26 is lifted and twisted during installation of the underdrain block 100.

The handle 26 is detached in this embodiment in substantially the same way as described above for underdrain block 10.

In another embodiment, shown in FIGS. 3A-3C, a receptacle 240 is placed in the sidewalls 20, 22 of an underdrain block 200 and a protrusion 224 is placed at the bottom end 38 of each of the vertical portions 32, 34 of the handle 26 extending in an inward direction towards the opposing vertical portions 32, 34 of the handle 26. This embodiment works in a similar fashion to the underdrain block 10.

The protrusion 224 on the bottom end 38 of the vertical portions 32, 34 of the handle 26 has a triangular cross-section such that a bottom surface 244 of the protrusion 224 slopes down and toward the vertical portions 32, 34 of the handle 26. A top 242 of the protrusion 224 is a flat plane perpendicular to the vertical portions 32, 34 of the handle 26. The horizontal portion 28 of the handle 26 is sized to be slightly larger than the width of the underdrain block 200. The connection between the horizontal portion 28 of the handle 26 and the vertical portions 32, 34 of the handle 26 has some flexibility to allow the vertical portions 32, 34 of the handle 26 to flex in an outward direction when an outward force is placed on them and return to their original positions when the force is removed.

The receptacle 240 in the sidewalls 20, 22 of the underdrain block 200 is a recess that is sized and/or shaped to correspond with the size and/or shape of the protrusions 224 on the handle 26. The receptacle 240 has a top edge 246 and a bottom edge 250 that are generally flat.

The handle 26 is placed over the top wall 16 of the underdrain block 200 such that the horizontal portion 28 of the handle 26 is parallel with the top wall 16 of the underdrain block 200 and the vertical portions 32, 34 of the handle 26 are parallel with the sidewalls 20, 22 of the underdrain block 200 with the protrusions 224 on the handle 26 located directly above the recesses. The handle 26 is then forced downward indicated by arrow A so that the sloped bottom surface 244 of the protrusion 224 on the vertical portions 32, 34 of the handle 26 contacts a top corner 280 of the underdrain block 200. As the handle 26 continues to be forced downward indicated by arrow A, the flat top corner 280 of the underdrain block 200 forces the sloped bottom surface 244 of the protrusion 224 in an outward direction where it is held by the sidewalls 20, 22 as the handle 26 moves in the downward direction. When the top edge 246 of the receptacle 240 is in a position just above the top surface 242 of the protrusion 224, the outward force from the sidewalls 20, 22 on the protrusion 224 on the vertical portions 32, 34 of the handle 26 is released. The vertical portions 32, 34 of the handle 26 return to their original position and snap into the receptacle 240 in the sidewalls 20, 22. When an upward force is applied to the horizontal portion 28 of the handle 26 in order to lift and move the underdrain block 200, the protrusion 274 on the handle 26 extending into the receptacle 240 in the sidewalls 20, 22 acts to lock the handle 26 to the underdrain block 200.

After the underdrain block 200 has been installed, the handle 26 may be removed in a manner similar to the way in which it was attached. The handle 26 is forced downward indicated by arrow A until the flat bottom edge 250 of the receptacle 240 contacts the sloped bottom surface 244 of the protrusion 224. As the handle 26 continues to be forced downward indicated by arrow A, the flat bottom edge 250 of the receptacle 240 forces the sloped bottom 244 of the protrusion 224 out of the receptacle 240 and the vertical portions 32, 34 of the handle 26 away from the sidewalls 20, 22 of the underdrain block 200. When the top edge 242 of the protrusion 224 has completely passed the bottom edge 250 of the receptacle 240, the protrusion 224 is completely free from the receptacle 240 and the handle 26. By moving the handle 26 in a direction parallel to the longitudinal axis of the block, the handle 26 can be detached from the underdrain block 200.

While in this case the protrusion has a triangular cross section and the receptacle is a square hole, it is contemplated that any size and shape combination of protrusion and receptacle that provides for sufficient attachment of the handle could be used. For example, the protrusion on the vertical portion of the handle could be a hook and the receptacle in the sidewall of the underdrain block could have an angled top and bottom edges corresponding to the angle of the hook. In addition, the receptacle need not be a recess but could be a simple loop or eyelet. Depending on the size and shape configuration, the protrusion and/or receptacle may not automatically provide the outward force on the vertical portions of the handle needed to attach and detach the handles as described for this embodiment. In this case, it would be necessary for the user of the handle to manually apply the outward force as necessary to attach and detach the handles. An example of such an embodiment would be a protrusion that is an upward-facing hook on the vertical portion of the handle, and a receptacle on the sidewall of the underdrain block that is a loop or an eyelet.

The protrusion may be a separate piece attached to the handle via a screw, adhesive, or any other suitable attachment means or it may be integrally molded with the handle. It may be made of the same material as the handle or from any material suitable for the use in the filter bed installation environment, including, but not limited to, corrosion-resistant metal, plastic, or resin.

The receptacle may be introduced into the underdrain block by operations including, but not limited to, cutting and drilling or may be integrally molded into the underdrain block.

Alternatively, the receptacle in the underdrain block could be eliminated, in which case the protrusion 224 and the vertical portions 32, 34 of the handle 26 would be forced in the outward direction until the bottom wall 18 of the underdrain block 200 is in a position just above the top 242 of the protrusion 224, at which point the vertical portions 32, 34 of the handle 26 would return to its original position. The protrusion 224 would then extend under the bottom wall 18 of the underdrain block 200, supporting the underdrain block 200 as upward force is applied to the handle 26 to lift and position the underdrain block. Additionally, a groove in the bottom wall 18 of the underdrain block corresponding in size and/or shape to the protrusion 224 could be provided to further attach the handle 26 to the underdrain block and prevent the handle 26 from moving in the longitudinal direction along the underdrain block. Removal of the handle 26 may be accomplished by pushing down on the horizontal portion 28 of the handle 26 to disengage the protrusion 224 from the bottom wall 18 and flexing the vertical portions 32, 34 of the handle 26 in an outward direction.

In two more embodiments, shown in FIGS. 4A-4C and 5A-5C, the protrusion may be a T-shaped post 324, 424 having a circular top portion 382, 482 with a larger diameter than the diameter of a cylindrical central axis 384, 484 of the protrusion 324, 424. A receptacle 340, 440 for receiving the protrusion 324, 424 may be a recession or a hole having a keyhole shape, with a first portion 386, 486 generally circular and having a diameter slightly larger than the top portion 382, 482 of the protrusion 324, 424, and a second slot portion 388, 488 having a width slightly larger than the diameter of the central axis 384, 484 of the protrusion 324, 424.

The handle 26 is placed over the top wall 16 of an underdrain block 300, 400 such that the horizontal portion 28 of the handle 26 is parallel with the top wall 16 of the underdrain block 300, 400, and the vertical portions 32, 34 of the handle 26 are parallel with the sidewalls 20, 22 of the underdrain block 300, 400. Regardless of whether the protrusion 324 is on the sidewalls 20, 22 (FIGS. 4A-4C) of the underdrain block 300 or the vertical portions 32, 34 of the handle 26 (FIGS. 5A-5C), the handle 26 is positioned so that the top portion 382, 482 of the protrusion 324, 424 is received in the first portion 386, 486 of the receptacle 340, 440. It may be necessary to manually flex the vertical portions 32, 34 of the handle 26 in an outward direction to accomplish this. The handle 26 is then pulled in an upward direction such that the central axis 384, 484 of the protrusion 324, 424 slides into the second slot portion 388, 488 of the receptacle 340, 440, attaching the handle 26 to the underdrain block 300, 400. If the receptacle 340 is placed on the sidewalls 20, 22 as in underdrain block 300, the first portion 386 is closest to the bottom of the underdrain block 300, and the second slot portion 388 extends towards the top of the underdrain block 300. If the receptacle 440 is placed on the vertical portions 32, 34 of the handle 26 as in underdrain block 400, the orientation of receptacle 440 should be reversed such that the first portion 486 of the receptacle 440 is closest to the top of the underdrain block 400 and the second slot portion 488 extends towards the bottom of the underdrain block 400.

The handle 26 is released from the underdrain block 300, 400 by pushing the handle 26 in a downward direction until the top portion 382, 482 of the protrusion 324, 424 coincides with the first portion 386, 486 of the receptacle 340, 440 and, if necessary, manually flexing the vertical portions 32, 34 of the handle 26 in an outward direction to remove the top portion 382, 482 of the protrusion 324, 424 from the first portion 386, 486 of the receptacle 340, 440.

Although the first portion 386, 486 of the receptacle 340, 440, the top portion 386, 486 of the protrusion 324, 424, and the central axis 384, 484 of the protrusion 324, 424 have been described and shown in the figures to be circular, they may take any suitable shape and/or cross section that will cause the top portion 386, 486 of the protrusion 324, 424 to lock the handle 26 to the underdrain block 300, 400 when the central axis 384, 484 of the protrusion 324, 424 has been received in the second slot portion 388, 488 of the receptacle 340, 440.

Figure 6:
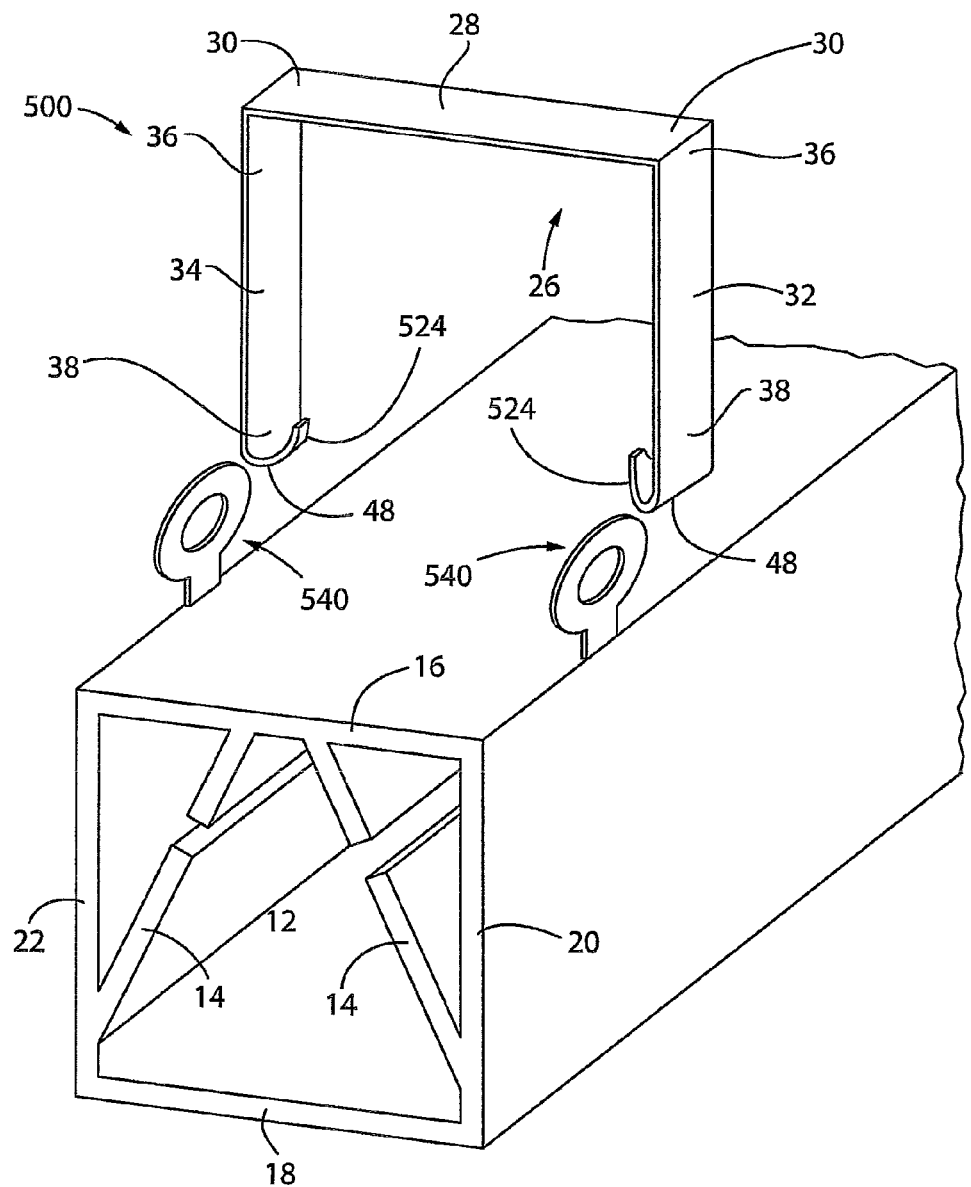
FIG. 6 is a perspective view of a sixth embodiment of an underdrain block according to the invention.

Alternatively, at least one protrusion or receptacle may extend from the top wall of the underdrain block with the vertical portion of the handle having the other of a protrusion or receptacle. In one such embodiment, two triangular protrusions, as were described, attached to the sidewalls 20, 22 in underdrain block 10 are attached at the opposite edges of the top wall 16 where it connects to the sidewalls 20, 22 and the handle 26 is the same as that used for underdrain block 10. In another such embodiment, shown in FIG. 6, two receptacles 540 in the form of loops, eyelets, or another suitable shape are attached at the opposite edges of the top wall 16 where it connects to the sidewalls 20, 22 and the vertical portions 32, 34 of the handle 26 has a protrusion 524 that is a hook or some other suitable shape for engaging with the receptacles 540 to lift an underdrain block 500. Alternatively, the protrusion in the shape of a hook or some other suitable shape for engaging with the receptacles could be attached to the top edge of the underdrain block and the vertical portions of the handle could have receptacles in the form of a hole for receiving the protrusions.

Figure 7:
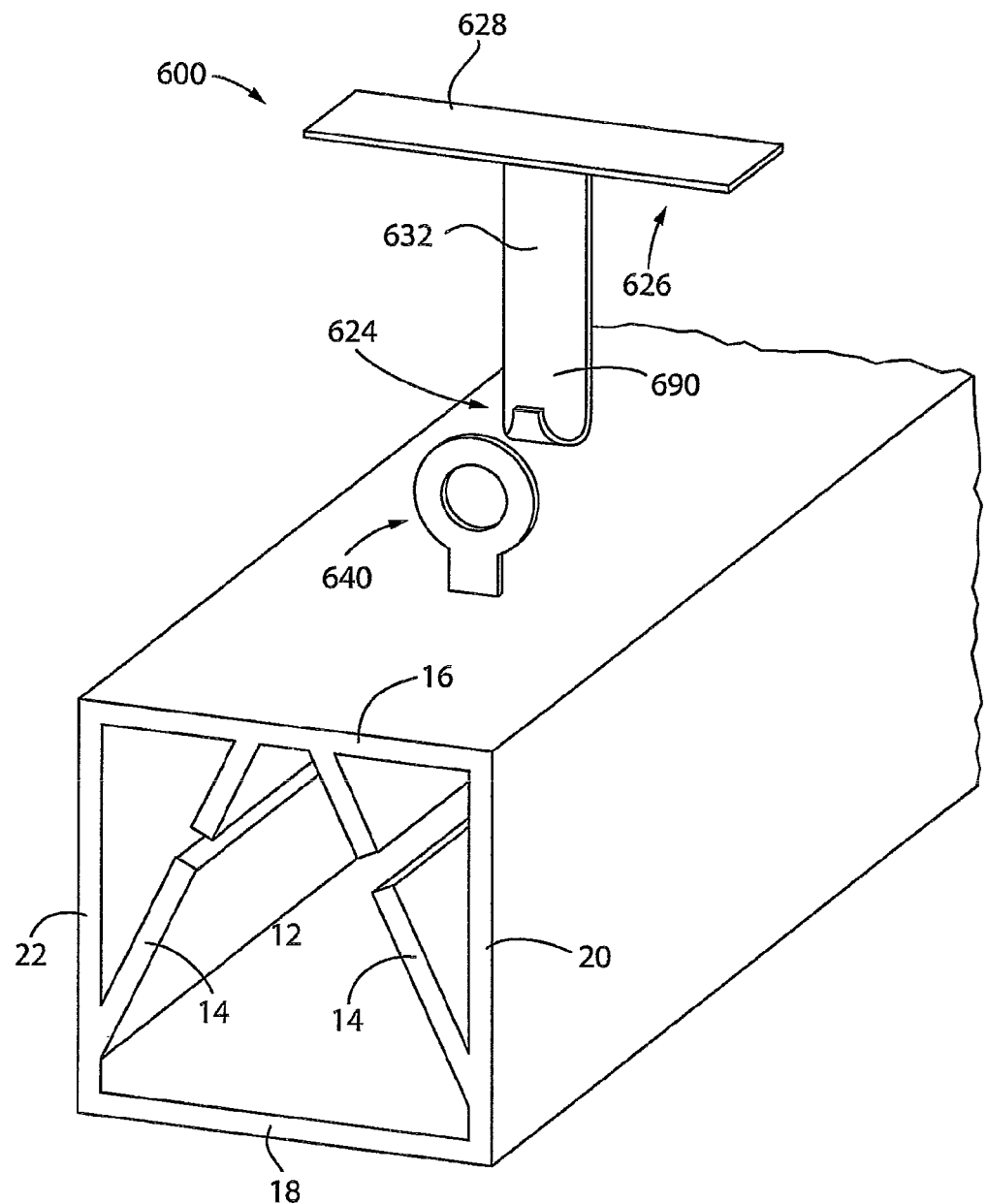
FIG. 7 is a perspective view of a seventh embodiment of an underdrain block according to the invention.

In yet another embodiment, shown in FIG. 7, a single receptacle 640 in the form of a loop, an eyelet, a threaded recess, an engagement for a push fitting, or another suitable shape is attached to the center of the top wall 16. A handle 626 in this embodiment has only one vertical portion 632 extending from the center of a horizontal portion 628 to form a T-shape. At a bottom end 690 of the vertical portion 632 of the handle 626, there is a protrusion 624 that is a hook, a screw boss, a push fitting, or some other suitable shape for engaging with the receptacle 640 to lift an underdrain block 600. Alternatively, the protrusion could be on the block and the receptacle could be on the vertical portion of the handle.

As has been described, it should be understood that the protrusion/receptacle elements for attaching and detaching the handle from the block are interchangeable in that the external detail on the underdrain block may be a protrusion, and the handle may have a receptacle or the handle may have a protrusion, and the external detail on the underdrain block may be a receptacle. In addition, a suitably shaped and sized protrusion may be matched with any suitably shaped receptacle as long as the handle may be positively attached and detached from the underdrain block. Receptacles include, but are not limited to, holes, recesses, slots, loops, and eye hooks. Protrusions include, but are not limited to, tabs, extensions, posts, and hooks.

While the handle has been described as U-shaped or T-shaped, it may take any shape that allows it to engage the underdrain block and provides for lifting the underdrain block after engagement. In addition, the handle may be rigid as long as it flexes enough to allow for attachment and detachment from the underdrain block or it may be flexible, such a strap that can be manually attached and detached from the underdrain block.

Figure 8:
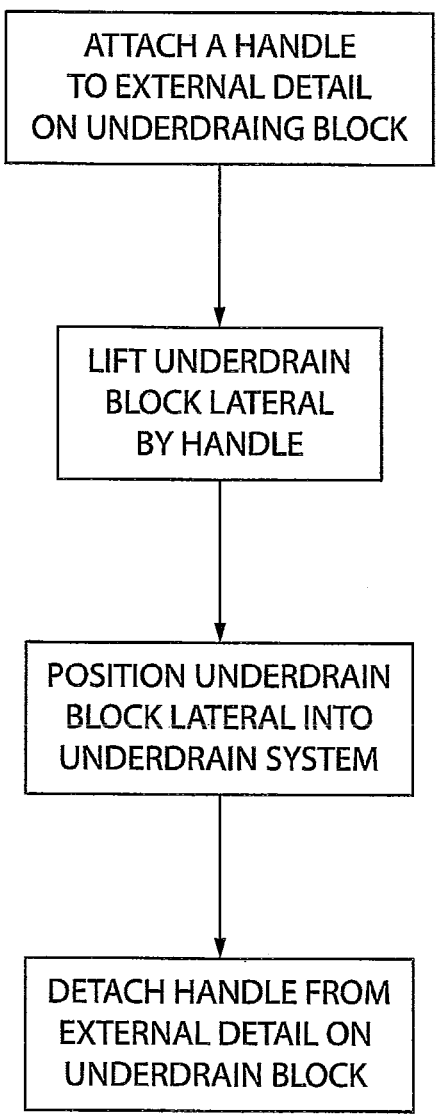
FIG. 8 is process flow diagram of a method of installing an underdrain block lateral according to an embodiment of the present invention.

The invention also includes a method summarized in the process flow diagram of FIG. 8. A method for installing an underdrain block lateral that includes at least one underdrain block includes the steps of: attaching at least one handle to external details on the underdrain block sidewalls or top wall; lifting the underdrain block lateral by the handle; positioning the underdrain block lateral into the underdrain system; and detaching the handle from the external details of the underdrain block sidewalls or top wall. The external details, attachment of the handle to the underdrain block lateral, and detachment of the handle from the underdrain block lateral may be accomplished using any of the structures and methods described above. When a plurality of underdrain blocks are combined into a lateral, a plurality of handles may be used to lift the lateral into position, but it is not necessary to provide a handle for every block. For instance, a lateral of three or four blocks can easily be maneuvered with the use of two handles.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of this specification. For example, it is to be understood that the present invention contemplates that, to the extent possible, one or more features of any embodiment can be combined with one or more features of any other embodiment.

The invention claimed is:

1. An underdrain block for use in draining and backwashing filtering media in a filter bed of the type where liquid may be supplied to the filtering media from a position vertically above the media and passed down through the media to an underdrain system including a plurality of said underdrain blocks, said underdrain block comprising:
   a plurality of exterior walls defining a hollow interior and having a longitudinal axis, said exterior walls including a top wall, a bottom wall, and a pair of sidewalls extending between said top wall and said bottom wall, said sidewalls, top wall, or both having at least one external detail and said top wall having at least one aperture; and
   a handle detachably connected to the at least one external detail for transportation and positioning of said underdrain block,
   wherein the handle comprises a horizontal portion and two vertical portions attached to each end of the horizontal portion, and
   wherein an attachment point between the horizontal portion and each of the vertical portions is flexible enough to allow the vertical portions to be deflected outwardly a distance which is at least equivalent to a width of the at least one external detail, and return to their original positions when a deflecting force is removed.

2. The underdrain block for use in draining and backwashing filtering media in a filter bed according to claim 1, wherein the at least one external detail comprises one of a protrusion or a receptacle for receiving a protrusion, and the handle includes the other of a protrusion or a receptacle for receiving a protrusion.

3. The underdrain block for use in draining and backwashing filtering media in a filter bed according to claim 2, wherein the at least one protrusion or receptacle for receiving a protrusion corresponds with the other of a protrusion or a receptacle for receiving a protrusion on the handle such that, when a corresponding protrusion is received in a corresponding receptacle, the handle is detachably attached to the underdrain block.

4. The underdrain block for use in draining and backwashing filtering media in a filter bed according to claim 2, wherein at least one external detail is a protrusion and the handle has at least one hole.

5. The underdrain block for use in draining and backwashing filtering media in a filter bed according to claim 1, wherein the at least one external detail is a protrusion having a top portion and a bottom portion, wherein an upper surface of the top is sloped and the bottom portion is sized and shaped to correspond with a correspondingly sized and shaped hole in the handle.

6. The underdrain block for use in draining and backwashing filtering media in a filter bed according to claim 1; wherein the handle further comprises a protrusion or a receptacle for receiving a protrusion at the bottom end of each of the vertical portions.

7. The underdrain block for use in draining and backwashing filtering media in a filter bed according to claim 6, wherein the handle comprises at least one receptacle for receiving a protrusion and said receptacle is a hole.

8. The underdrain block for use in draining and backwashing filtering media in a filter bed according to claim 1, further comprising more than one external feature on each sidewall and at least one handle.

* * * * *